Feb. 23, 1954        P. L. ADAMS         2,670,007
VALVE FLOAT COUPLING
Filed Oct. 18, 1949
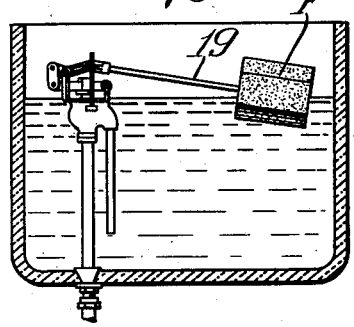
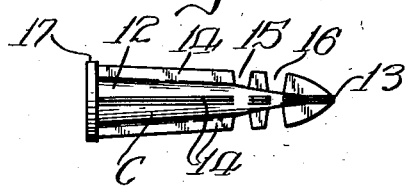
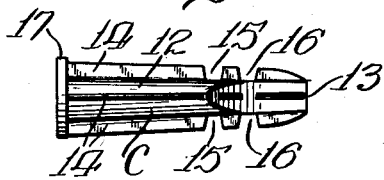
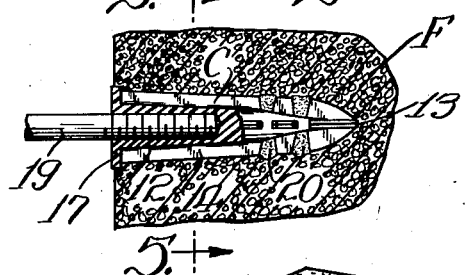
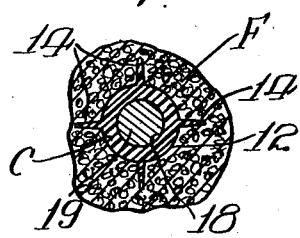
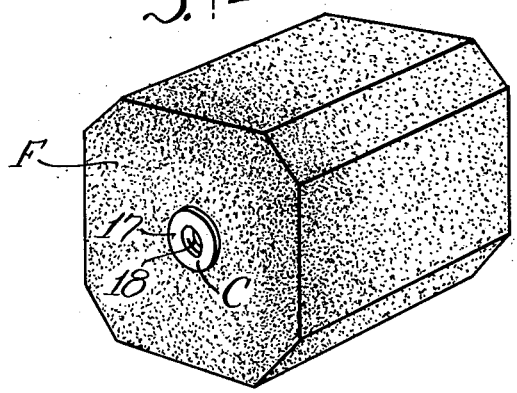
INVENTOR.
Paul L. Adams
BY Patented Feb. 23, 1954

2,670,007

UNITED STATES PATENT OFFICE 2,670,007

VALVE FLOAT COUPLING

Paul L. Adams, Dubuque, Iowa

Application October 18, 1949, Serial No. 122,059

4 Claims. (Cl. 137—452)

This invention relates to a coupling in the form of a bushing which is especially designed for attachment to valve floats made from a solidified foam material such as "Styrofoam." This material is light, buoyant, non-corrosive, inexpensive, and well-adapted for use as a valve float, especially in a sanitary toilet water closet or tank. In such an installation the float is carried by one end of a rod which operates a valve. The fastening of a float of this material to the valve rod is extremely difficult because the float material has practically no mechanical strength due to its numerous cellular walls which are readily crushed.

My invention pertains to the coupling which is in the form of a tubular tapered bushing that is hollow for about two-thirds of its length, and provided with longitudinal ribs or flutes on its exterior surface and a head at its large end.

The inside walls of such a bushing are tapped to receive the end of the threaded valve rod. This bushing may be forced endwise into the float body without pre-drilling of any hole therein, due to the tapered contour of the bushing and the semi-plastic characteristics of the solidified foam which permits it to yield without fracture and still maintain some elastic pressure. The longitudinal ribs resist axial and rotative movement of the bushing and simultaneously serve to increase the amount of external surface which is in frictional contact with the float. I provide in the ribs one or more interruptions in the form of notches for the purpose of receiving and retaining a suitable adhesive. For example, it may be expedient to dip the bushing into an adhesive just prior to pressing the bushing into the body of the float. The adhesive material which lies in the rib notches is not wiped off by the frictional contact of the bushing with the float material as the bushing is forced inwardly, and will tend to flow into the adjacent cells of the float body thereby to establish a positive interlock therewith.

The objects of my invention are to provide a coupling capable of being forcibly inserted into a solidified foam float so as to remain firmly anchored therein for the purpose of providing an anchorage for attachment thereto of a standard sanitary water closet valve float rod.

Another object is to provide for use with a solidified foam float a coupling which is easily attached thereto and which is inexpensive to produce.

Another object is to provide a coupling which makes it possible to use a solidified foam material as an inexpensive replacement float for worn-out metal floats in water closets and the like without renewing the original float rod.

Other objects and advantages will become apparent from a consideration of the following detailed description taken in connection with the accompanying drawings wherein a suggestive embodiment of this invention is shown. However, it will be understood that this invention is not limited to the details disclosed, but includes all such variations and modifications as fall within the spirit of the invention and the scope of the appended claims.

Referring now to the drawings:

Figure 1 is a view in vertical section through a conventional water closet tank, showing in elevation the present float installation;

Fig. 2 is a top plan view of the coupling;

Fig. 3 is a side elevation thereof;

Fig. 4 is a fragmentary top sectional view of the float, showing the coupling embedded therein for attachment thereto of the end of a valve operating rod;

Fig. 5 is a transverse section, taken on line 5—5 of Fig. 4; and

Fig. 6 is a perspective view of a solidified foam float with the present coupling attached thereto.

In detail, the invention herein described comprises a coupling C in the form of a bushing which is made preferably of plastic. This bushing is adapted to be inserted in a float F made of a solidified foam, such as Styrofoam, for example. The bushing has a tabular body 12 which tapers and curves gradually to a point 13, when viewed from the top as shown in Fig. 2. When viewed from the side, as in Fig. 3, the taper is less pronounced, and terminates in a truncated end.

Longitudinal ribs 14, disposed equidistantly from each other, extend for the length of the bushing. These ribs 14 are interrupted or notched as shown at 15 and 16 in Figs. 2 and 3. An annular flange 17 provides a head at the large end of the bushing and joins with the proximate ends of the ribs 14. A central hole or socket 18 extends into the bushing from its head end for approximately one-half of its length. The walls of the socket 18 are tapped to receive the threads of a rod 19 when it is rotated therein.

To anchor this bushing to a float of solidified foam, it is advisable to first coat (as by dipping or otherwise) the small end portion of the bushing with a suitable adhesive, some of which, designated as 20, remains in the notches 15 and 16. The bushing is then forced endwise against one face of the solidified foam float and into the body thereof until the bushing comes to rest with its head in countersunk relation, partly or completely, with the surface of the float, as shown in Fig. 4. The head 17 will serve to add rigidity, cover any irregularities or spalling caused by the pressing operation, and prevent any squeeze-out of the adhesive. Much of the adhesive retained within the notches 15 and 16 will flow into the adjacent cells of the float body to establish an interlock therewith, and accordingly will serve effectively to cement the bushing to the solidified foam at those points of contact. The entire bushing is thus firmly and rigidly anchored within the float. The ribs effectively act to prevent any relative axial or rotative movement, and together with the float body 12 present an adequately extended surface of contact to assure a firm and secure anchorage of the coupling in place, as the coupling is enlarged in cross section substantially beyond that of the rod to acquire a circumferential exterior surface area which is a multiple of that of the rod for the same length. The chamber in the body of the float in which the coupling is accommodated is open at one of the faces of the body of the float and the entire circumferential exterior surface of the coupling is engaged by the surrounding cellular walls of said chamber with an elastic pressure transmitted reactively thereto while the coupling maintains against said cellular wall a light compressive force insufficient to produce crushing thereof. When fully installed, the bushing is ready to receive the threaded end of a standard float valve rod which, when rotatively fitted therein, will provide therewith a rigid serviceable unit.

I claim:

1. A float for operating a valve mechanism comprising a float of crushable solidified cellular foam material such as Styrofoam and the like, and means for securing the float to the valve including a coupling, said coupling comprising a rod-attaching bushing in the form of a body tapered toward a point at one end and having a longitudinal rib extended radially therefrom there being a notch in the rib, said bushing adapted for reception within the float body when advanced endwise therein, and settable plastic means within the rib notch interlocking also with the cellular structure of the solidified foam float body to establish a positive connection therewith.

2. For use with a valve rod having a cylindrical end portion formed exteriorly with screw threads, a float body of solidified foam, such as Styrofoam and the like, characterized by cellular resilient walls having a low resistance to crushing, and an elongated tapered coupling having an opening to receive the screw threaded end portion of the valve rod and interlock therewith, the coupling having an extended flanged portion to acquire a circumferential exterior surface area relatively large as compared to its volume, the coupling being pressed into the float body to crush a portion of the cellular walls therein to form in the float body an elongated chamber opening upon one of its faces and having a cross sectional form the same in size and contour as that of the coupling, the coupling, when so pressed into the float body, having its circumferential exterior surface engaged by all the adjacent surrounding cellular walls of the float body with an elastic pressure transmitted reactively to the coupling and said coupling maintaining against the float body a light compressive force insufficient to produce crushing of its cellular walls.

3. For use with a valve operating rod having a cylindrical end portion formed exteriorly with screw threads, a float for operating said rod comprising a buoyant body of cellular material, such as Styrofoam and the like, which is characterized by slightly elastic cellular walls having a low resistance to crushing and means for securing the body to the said valve operating rod including a coupling member having an opening to receive the screw threaded end portion of the valve rod and having an extended flanged portion contacting a part of the body under a pressure sufficient to cause an elastic yield without crushing of the cellular walls in such part, said coupling portion thereby having a surface area in contact with said part of the body relatively large as compared to the volume of such coupling portion and with the coupling member being retained in position at least in part by the elastic pressure of the cellular walls in contact therewith.

4. A float for operating a valve mechanism comprising a buoyant body of cellular material, such as Styrofoam and the like, which is characterized by slightly elastic cellular walls having a low resistance to crushing and means for securing the body to the valve including a tapered coupling member having an elongated cylindrical chamber formed therein and provided with internal threads adapted to engage the threads on a valve actuating rod, a plurality of radial fins formed on the coupling member and extending longitudinally of the chamber, said fins being spaced around the coupling member and defining angles of less than 180° therebetween, said fins providing said coupling member with a surface area relatively large as compared to its volume, with said coupling member being inserted under pressure into the body to crush some of the cellular walls to accommodate the coupling and to form within the float body an opening conforming closely to the size and cross sectional form of the coupling and with the cellular walls immediately surrounding the opening remaining intact and being compressed between the fins to exert upon the coupling a reactive pressure sufficient frictionally to hold the coupling in assembled relation with the float body.

PAUL L. ADAMS.

References Cited in the file of this patent

UNITED STATES PATENTS

| Number | Name | Date |
|--------|------|------|
| 585,449 | Rockwell | June 29, 1897 |
| 645,069 | Christensen | Mar. 13, 1900 |
| 722,046 | Rieger | Mar. 3, 1903 |
| 750,536 | Haggerty | Jan. 26, 1904 |
| 780,957 | Palmer | Jan. 24, 1905 |
| 983,479 | Clements | Feb. 7, 1911 |
| 1,000,715 | Caywood | Aug. 15, 1911 |
| 1,257,295 | Slattery | Feb. 19, 1918 |
| 1,373,645 | Bandoly | Apr. 5, 1921 |
| 1,466,494 | Wallmann | Aug. 28, 1923 |
| 1,547,052 | Larson | July 21, 1925 |
| 1,922,120 | Brosig | Aug. 15, 1933 |
| 2,299,670 | Westcott | Oct. 20, 1942 |
| 2,307,874 | Belde | Jan. 12, 1943 |
| 2,428,676 | Moore | Oct. 7, 1947 |
| 2,528,675 | Tinnerman | Nov. 7, 1950 |

FOREIGN PATENTS

| Number | Country | Date |
|--------|---------|------|
| 195,672 | Great Britain | Apr. 12, 1923 |

OTHER REFERENCES

Modern Plastics for March 1945, published by Breskin Publications, Inc., Bristol, Conn. Pages 106, 107, 108, 109, 202.

Styrofoam (Type 103.7) Technical Data. Copyright, 1947, The Dow Chemical Co., Midland, Mich.